(12) United States Patent
Li

(10) Patent No.: US 9,266,400 B2
(45) Date of Patent: Feb. 23, 2016

(54) INSERTABLE INDICATOR WITH A SPARE RECEPTACLE AND TIRE PRESSURE STATUS INSTRUMENT

(71) Applicant: Steelmate Co., Ltd., Zhongshan, Guangdong (CN)

(72) Inventor: Zhitao Li, Zhongshan (CN)

(73) Assignee: Steelmate Co., Ltd., Zhongshan, Guangdong (CN)

( * ) Notice: Subject to any disclaimer, the term of this patent is extended or adjusted under 35 U.S.C. 154(b) by 0 days.

(21) Appl. No.: 14/376,844

(22) PCT Filed: Jan. 28, 2013

(86) PCT No.: PCT/CN2013/071017
§ 371 (c)(1),
(2) Date: Aug. 5, 2014

(87) PCT Pub. No.: WO2014/094382
PCT Pub. Date: Jun. 26, 2014

(65) Prior Publication Data
US 2015/0035667 A1 Feb. 5, 2015

(30) Foreign Application Priority Data
Dec. 20, 2012 (CN) .......................... 2012 1 0559341

(51) Int. Cl.
*B60C 23/04* (2006.01)
*B60R 11/02* (2006.01)

(52) U.S. Cl.
CPC .......... *B60C 23/0401* (2013.01); *B60C 23/0435* (2013.01); *B60C 23/0479* (2013.01); *B60C 23/0491* (2013.01)

(58) Field of Classification Search
CPC ............ B60C 23/0401; B60C 23/0479; B60C 23/0444; B60C 23/0491; B60C 23/0435
USPC .................... 340/447, 461, 462, 693.1, 693.5
See application file for complete search history.

(56) References Cited

U.S. PATENT DOCUMENTS

| | | | |
|---|---|---|---|
| 6,868,718 B1 * | 3/2005 | Hui et al. ........................ | 73/146 |
| 7,024,928 B1 * | 4/2006 | Chen ............................ | 73/146.8 |
| 2006/0125613 A1 * | 6/2006 | Ko ................................ | 340/447 |
| 2007/0109112 A1 * | 5/2007 | Lee et al. ...................... | 340/447 |
| 2010/0002421 A1 * | 1/2010 | Arnold, III .................... | 362/183 |
| 2012/0169272 A1 * | 7/2012 | Khalepari .................... | 320/107 |
| 2013/0342158 A1 * | 12/2013 | Zhong .......................... | 320/107 |

* cited by examiner

*Primary Examiner* — Daniel Wu
(74) *Attorney, Agent, or Firm* — Molins and Co. Pty. Ltd.

(57) ABSTRACT

An Insertable indicator with a spare receptacle includes an indicating component and a power getting plug, the indicating component comprises an enclosure and an display screen disposed in the enclosure for displaying content, the power getting plug is intended for connection with a car power getting receptacle for obtaining power therefrom and supplying it to the display screen. The indicating component of the enclosure is pivoted with a side of an exposed end of the power getting plug; and an end surface of the exposed end of the power getting plug is provided with a spare receptacle electrically connected to the car power getting receptacle.

11 Claims, 5 Drawing Sheets

A-A

B-B

INSERTABLE INDICATOR WITH A SPARE RECEPTACLE AND TIRE PRESSURE STATUS INSTRUMENT

FIELD OF THE INVENTION

The present invention relates to a vehicle accessory and more particularly, relates to an insertable indicator with a spare receptacle mounted on a cigarette lighter receptacle of a car, and also relates to a tire pressure status instrument employing the same indicator.

BACKGROUND OF THE INVENTION

External tire pressure gauges have been used widely the fundamental principle underlying which involves an external sensor installed on the wheel hub of a tire. Said sensor includes a bridge electronic gas pressure sensing device for sensing gas pressure. It transforms gas pressure signal into electric signal and transmits the signal to a receiver through a radio transmitter device. Kinds of data changes may be displayed on a screen of the receiver. Or, they may take form of buzzing to remind the driver. In addition, in case that tire gas leakage occurs and pressure change exceeds a safe threshold, alter will be generated for ensuring safe driving.

Normally, the display of tire status and alerting device are disposed on the front console of the cab and are coupled with a car battery by a connecting line so as to be powered. This kind of devices and their connecting lines occupy space of the cab. Moreover, these connecting lines may be accidently touched by the driver. Furthermore, instruments on the front console of the cab may divert attention of the driver and thus result in bad influence on safe driving of the car. To make improvement, many solutions have been proposed in related industry to integrate tire pressure monitor function into the car console. The present applicant has also proposed implementation of tire pressure monitor by getting power from the car cigarette lighter receptacle. However, the former solution causes heavy cost and therefore is not suitable for car products available in the marketplace. The latter one occupies the cigarette lighter receptacle of the car and is not convenient for the driver to use other display devices.

In detail, according to the applicant's solution where power is obtained from the car cigarette lighter receptacle, the indicator and its power getting plug are integral. The indicator is basically perpendicular to an axis direction of the plug of the cigarette lighter receptacle and is fixed onto the same element. This causes some shortcomings.

At first, as the indicator is fixedly connected to the plug, it can present data to the user only from one angle thus lacking flexibility. In this situation, the user is limited to read displayed data in the visual range of the indicator.

Secondly, as the indicator is fixedly connected to the plug and the indicator uses relatively large space, indicators of the same size will not certainly be suitable for cars with different console streamline design. Moreover, use of space around the power getting receptacle may also be influenced, hence influencing manipulation of the driver. For example, this may possibly obstruct pushing action of the gear levers.

Thirdly, once one or two power getting receptacles on the car are occupied by the indicator, it will be impossible to provide power receptacle for other devices. Apparently, this kind of resource use lacks of efficiency.

SUMMARY OF THE INVENTION

A primary object of the Invention is to overcome drawbacks of the above prior art and propose an insertable indicator with a spare receptacle. The indicator is capable of adjusting displaying angle so as to optimize space around the console inside a car and also optimize utilization of power getting receptacle resources.

Another object of the invention is to use said indicator and provide a tire pressure status instrument.

To achieve the above objects, the following solution is proposed.

An Insertable indicator with a spare receptacle includes an indicating component and a power getting plug, the indicating component comprises an enclosure and an display screen disposed in the enclosure for displaying content, the power getting plug is intended for connection with a car power getting receptacle for obtaining power therefrom and supplying it to the display screen. The indicating component of the enclosure is pivoted with a side of an exposed end of the power getting plug; and an end surface of the exposed end of the power getting plug is provided with a spare receptacle electrically connected to the car power getting receptacle.

Specifically, an ear portion with a pivoting hole is formed on a periphery adjacent to one side of the bottom of the base; an ear portion with a pivoting hole is formed on a periphery at one side of an exposed end of the power getting plug; the pivoting holes of the ear portions of the enclosure and power getting plug are coaxially located; and a rotation shaft passes through both pivoting holes so as to realize pivoting.

Alternatively, an ear portion with a pivoting hole is formed on a periphery of one side of the bottom of the base; an ear portion with a pivoting hole is formed on a periphery at one side of an exposed end of the power getting plug; the pivoting holes of the ear portions of the enclosure and power getting plug are coaxially located; and a rotation shaft passes through both pivoting holes so as to realize pivoting.

Preferably, a friction cushion is placed between the ear portion of the enclosure and that of the power getting plug.

Furthermore, the enclosure of the indicating component comprises a base, an upper casing and an upper cover; the base and upper casing are fastened together to form a receiving space for installing the display screen; and a transparent window is defined in the upper cover for exposing the display screen.

In addition, the power getting plug further includes:

a conversion circuit for obtaining power from the car power getting receptacle and providing the same to the spare receptacle;

a positive electrode connecting element connected with the positive electrodes of the conversion circuit and car power getting receptacle;

a negative electrode connecting element connected with the negative electrodes of the conversion circuit and car power getting receptacle;

a lower casing inserted into the car power getting receptacle and having an inner space for accommodating the conversion circuit, positive and negative electrode connecting elements; and a lower casing covered on the exposed end of the lower casing so as to form an end surface of the exposed end.

The conversion circuit is integrated into two parallel circuit boards; and the spare receptacle is sandwiched between the two circuit boards.

Preferably, the spare receptacle is a USB socket.

Preferably further, the positive electrode connecting element comprises a positive electrode pushing needle and a positive electrode resilient tongue; one end of the positive electrode resilient tongue is exposed out of the power getting plug and connected with the positive electrode of the car power getting receptacle, and the other end thereof locates between the two conversion circuits; and the positive electrode resilient tongue connects the positive electrode pushing needle and one of the conversion circuit board.

Preferably, the negative electrode connecting element comprises a negative electrode resilient tongue and a spring bracket; part of the negative electrode resilient tongue is exposed out of the lower casing and connects the negative electrode of the car power getting receptacle; the negative electrode resilient tongue is mounted on the spring bracket and is positioned between the two conversion circuit boards and is electrically connected with the conversion circuit boards; and the spring bracket is also intended for maintaining separation between the negative electrode resilient tongue and the positive electrode pushing needle or between it and the positive electrode resilient tongue.

A tire pressure status instrument includes a tire pressure monitor circuit and a tire pressure signal receiving antenna. The instrument incorporates an insertable indicator with a spare receptacle aforementioned; and said tire pressure monitor circuit and tire pressure signal receiving antenna are disposed in the indicating component.

Compared to prior art, the invention has the following advantages.

At first, the insertable indicator with a spare receptacle obtains power from a car power getting receptacle by insertion, thus avoiding introducing the indicating component from the windshield of the car cab which otherwise would have diverted attention of the driver.

Secondly, the indicator may be rotated a certain angle respect to the power getting plug. By this manner, the indicator may be disposed at any angle within a certain angle range. This will help the drive adjust and watch the content displayed by the indicator.

Thirdly, due to introduction of a spare receptacle, other electric devices will also be powered with ease though the car power getting receptacle is occupied by the indicating component. In addition, a widely used USB socket is employed in the invention and this is convenient for providing power to many kinds of electric devices.

Fourthly, the USB socket is axially located on the power getting plug and is exposed out of the end surface thereof. On one hand, when the indicating component and end surface are assembled together, the USB socket will be covered by the indicator. On the other hand, when the indicating component is located away from the end surface, that is, when the indicating component is opened, insertion of the USB plug into the socket will not interfere with the indicator, and basically this will not increase space occupied by the USB plug. It will also not increase space occupied by the USB plug in the cab. Therefore, the turn-able indicating component and spare receptacle hidden into the power getting plug will not interfere with each other and will benefit from each other.

Finally, the insertable indicator with a spare receptacle of the invention has wide use. For example, it can be used as a tire pressure status instrument for detecting car tire pressure. It may also be used in other car-carried electric devices such as MP3, and navigator and is suitable for large scale production.

DETAILED DESCRIPTION OF THE INVENTION

The present invention is described in further detail in conjunction with various embodiments and accompanied drawings.

Figure 1:
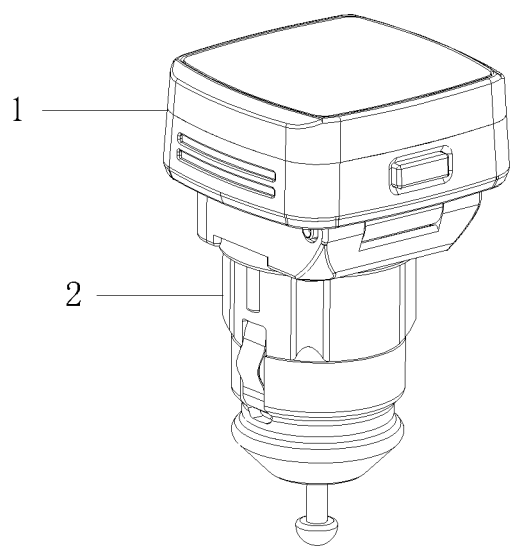
FIG. 1 shows a perspective view of an insertable indicator with a spare receptacle according to the invention.

Please refer to FIG. 1 showing a perspective view of an insertable indicator with a spare receptacle according to the invention. An insertable indicator with a spare receptacle includes a power getting plug inserted into a car power getting receptacle and an indicating component 1 disposed on the power getting plug 2. The indicating component 1 is powered by the power getting plug 2 so as to operate normally.

Figure 2:
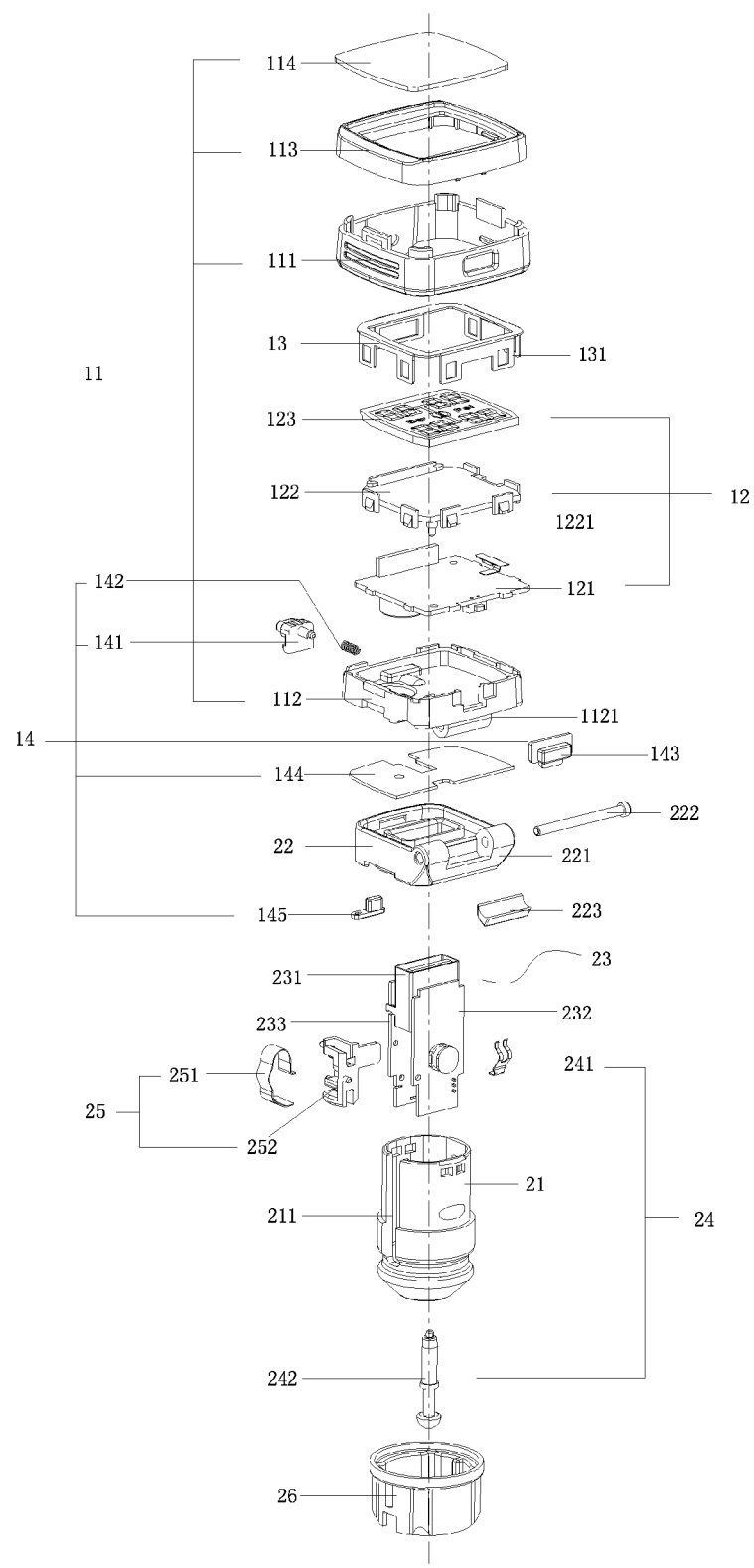
FIG. 2 shows an exploded perspective view of an insertable indicator with a spare receptacle.

Please refer to FIG. 2. The indicating component 1 includes an enclosure 11 composed of a number of parts and electronics disposed inside the enclosure 11. The enclosure 11 includes an upper casing 111, a base 112, an upper cover 113 and a transparent element 114. The enclosure 11 may take on square shape (as shown in FIG. 2) or circle shape. The upper casing 111 and base 112 are erectly assembled together to define a receiving space for receiving said electronics. Specifically, the electronics has a display screen 12 for displaying video information such as data and image. The display screen 12 includes a control circuit 121, a LCD panel 123 electrically connected to the control circuit 121, and a back light panel 122. The control circuit 121 is positioned on the base 112 and is secured thereon by a plurality of limiting grooves of the base 112. The back light panel 122 is stacked on the control circuit 121, and the LCD panel 123 is in turn stacked on the back light panel 122. The control circuit 121 processes signals input therein and then the LCD panel 123 displays them. Next, the back light panel 122 is switched on to illuminate the LCD panel 123. For the image displayed on the display screen to be easily seen by the driver and to protect the display screen 12, a transparent element 114 is provided on the screen 12. The transparent element 114 is fastened by an upper cover 113 sleeved on the upper casing 111. An aperture is defined in the upper casing 111 for accommodating said transparent element 114 thus providing a transparent window.

In this embodiment, a tire pressure status instrument is produced by addition of other functional components to the indicating component 1. In addition to said display screen 12, the tire pressure status instrument further includes a tire pressure monitor circuit and a tire pressure signal receiving antenna. The tire pressure monitor circuit is integrated with the control circuit 121 of the screen 12, and they are both printed on a same circuit board. The tire pressure signal receiving antenna takes form of antenna sheet 13. As shown in FIG. 2, the antenna sheet 13 is tightly pressed against a frame of the upper casing 111 of the indicator and is of a square frame shape. In addition, a plurality of supporting legs 131 is extended downwardly from the antenna sheet 13 for securing other components. The periphery of the back light panel 122 is provided with several holding brackets 1221 for locating said supporting legs 131. The antenna sheet 13 is located in place by said holding brackets 1221 of the back light panel 122. Then, the antenna sheet 13 is electrically connected with the control circuit 121 held below the back light panel 122. In case that the enclosure 11 is of circle, the antenna sheet 13 will correspondingly be of circle. The tire pressure signal receiving antenna receives signals including tire pressure date transmitted from the car tire pressure gauge and then send them to the tire pressure monitor circuit. The tire pressure monitor circuit analyzes said tire pressure signals and outputs tire pressure information to the display screen under control of the control circuit such that the information will be displayed by said display screen.

Figure 3A:
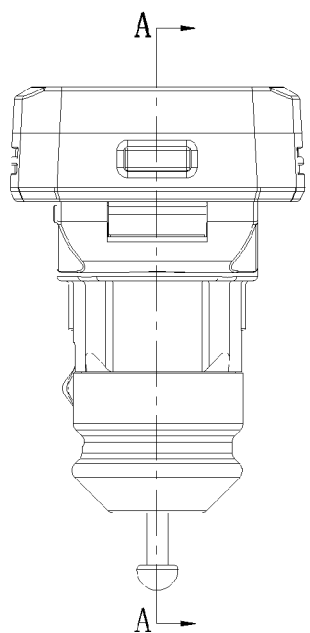
FIG. 3A shows a front view of an insertable indicator with a spare receptacle according to the invention.
Figure 3B:
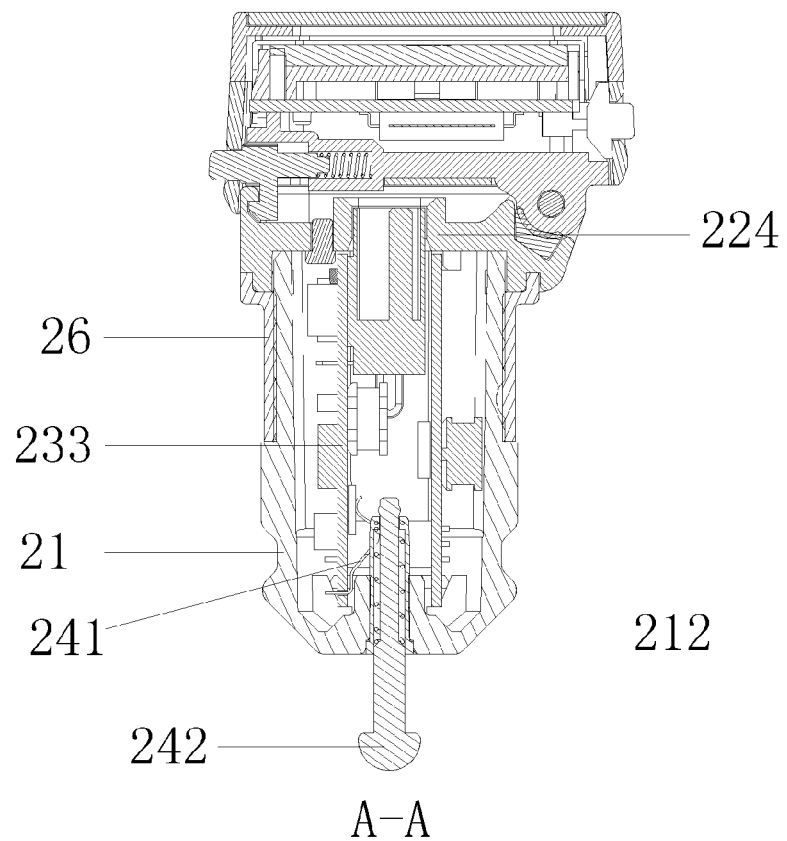
FIG. 3B shows a cross-sectional view along line A-A of FIG. 3A.
Figure 4A:
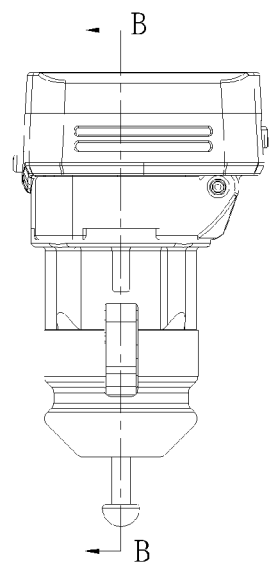
FIG. 4A shows a side view of an insertable indicator with a spare receptacle according to the invention.
Figure 4B:
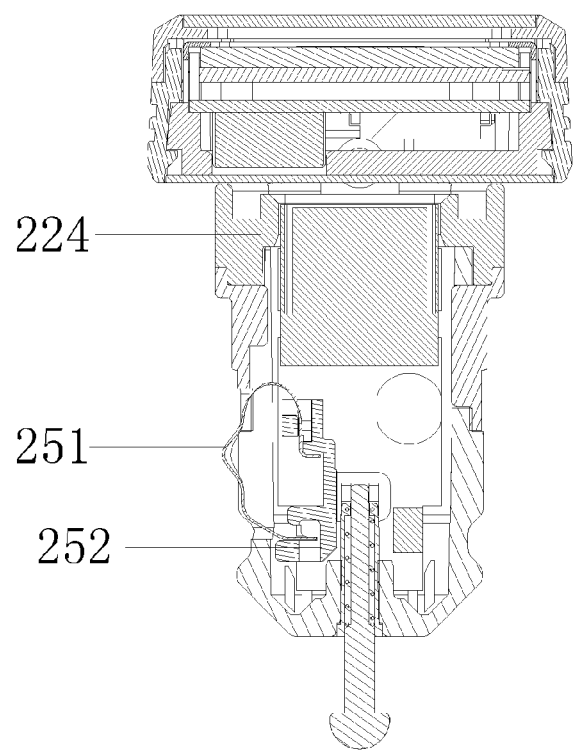
FIG. 4B shows a cross-sectional view along line B-B of FIG. 4A.

Please continue referring to FIG. 2. The power getting plug 2 includes:

a spare receptacle embodied in this embodiment as a USB socket 231;

a conversion circuit 23 shown as a USB conversion circuit 23 in this embodiment for getting power from car power getting receptacle and electrically connected with the USB socket 231, said USB conversion circuit 23 being integrated into two conversion circuit boards 232 and 233 respectively, said two conversion circuit boards 232 and 233 being welded onto two sides of the USB socket 231;

a positive electrode connecting element 24 electrically connected to the positive electrodes of the USB conversion circuit 23 and car power getting receptacle respectively, said positive electrode connecting element 24 including a positive electrode resilient tongue 241 and a positive electrode pushing needle 242. As shown in FIGS. 3A and 3B, one end of the positive electrode pushing needle 242 touches the positive electrode of the car power getting receptacle, while the other end thereof is disposed between the conversion circuit boards 232 and 233. The positive electrode resilient tongue 241 is constructed of metal sheet and forms a resilient construction. One end of the metal sheet is fixed onto the conversion circuit board 233 and is firmly pressed against one end of the positive electrode pushing needle 242 located between the two conversion circuit boards such that the positive electrode pushing needle 242 is electrically coupled with said conversion circuit board 233;

a negative electrode connecting element 25 connected with the negative electrodes of the USB conversion circuit and car power getting receptacle. The negative electrode connecting element 25 includes a negative resilient tongue 251 and a spring bracket 252. As shown in FIG. 4, the negative resilient tongue 251 is also made of a metal sheet and also forms a solid resilient construction. A middle segment of the metal sheet is protruded outwardly to touch the negative electrode of the car power getting receptacle. Two ends of the metal sheet are secured on the spring bracket 252 which is positioned between the conversion circuit boards 232 and 233 for maintain solid construction of the negative resilient tongue 251 and location of the negative resilient tongue 251 at the power getting plug 2. It further maintains a distance between the negative resilient tongue 251 and positive electrode pushing needle 242 or positive electrode resilient tongue 241 for avoiding short circuit. The negative resilient tongue 251 is electrically connected with the conversion circuit boards 232 and 233 through the spring bracket 252, thus finally electrically being connected with the negative electrodes of the USB conversion circuit 23 and power getting receptacle;

a lower casing 21 for accommodating said USB conversion circuit 23, positive electrode pushing needle 242, positive electrode resilient tongue 241, negative resilient tongue 251 and spring bracket 252. The lower casing 21 is of a cylindrical shape and a receiving space is defined therein. An opening is defined in an upper sidewall of the lower casing 21 for assembling said negative resilient tongue 251 and providing in advance an opening through which the negative resilient tongue 251 exposes out of the lower casing 21. As the assembling location of the negative resilient tongue 251 is determined, the assembling location of the USB conversion circuit 23 is also determined correspondingly. That is, the USB conversion circuit 23 is vertically disposed such that its USB socket 231 faces up and is disposed in a same plane with the negative resilient tongue 251. Said plane is a plane in which an axis of the opening 211 and lower casing locates. The lower portion of the lower casing 21 tapers inwardly such that a central through hole 212 is defined at the axis for passing through of the positive electrode pushing needle 242;

a lower cover 22 covered on an end surface of the lower casing 21 and exposed out of the car power getting receptacle, a platform is formed on the lower cover 22 for engaging the base 112 of the indicating component 1. Referring to FIGS. 3A-3B, 4A-4B and 5, the upper portion of the lower cover 22 is of square corresponding to that of the base 112, while the lower portion thereof is of cylinder corresponding to that of the lower casing 21. A rectangular through hole 224 is defined axially and centrally in the lower cover 22 for receiving the USB socket 231 of the conversion circuit 23 of the lower casing 21. The USB socket 231 contained in said rectangular through hole 224 is a spare receptacle;

a silicone ring 26 for limiting location of the power getting plug at the car power getting receptacle. The silicone ring 26 is tightly sleeved on the upper portion of the lower casing 21. The total height of the silicone ring 26 from top to bottom doesn't exceed a protrusion of the negative resilient tongue 251. When the power getting plug is inserted into the power getting receptacle, the silicone ring 26 will be inserted into a gap between an outer wall of the plug and inner wall of the receptacle, thus preventing loosing of the plug.

Figure 5:
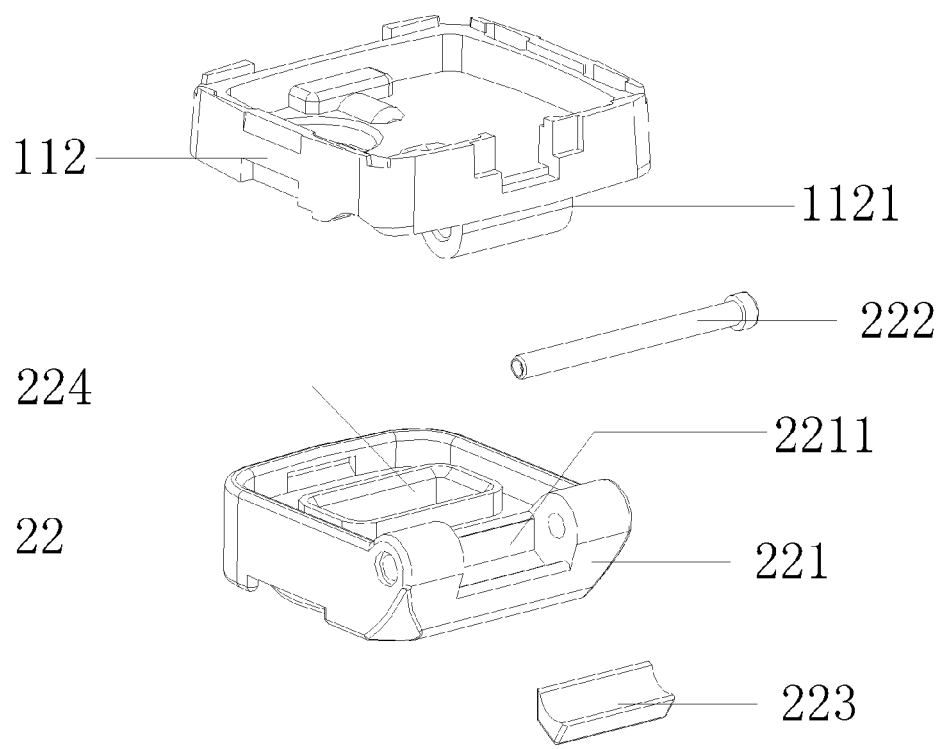
FIG. 5 shows an exploded perspective view of a base and lower cover of insertable indicator with a spare receptacle according to the invention, illustrating mainly pivoting structure of the base and lower cover and location of a through hole from which a USB socket exposes.

The indicating component 1 and power getting plug 2 are connected to each other by a pivoting construction. As shown in FIG. 5 in details, a pair of first pivoting portions 221 is formed at one side of an exposed end surface of the power getting plug of the lower cover 22. The pair of the pivoting portions takes form of a pair of ear portions each has a horizontal through hole defined therein as shown in FIG. 5. a groove 2211 is defined between the two ear portions. Correspondingly, a pair of second pivoting portions 1121 is formed on the base 112 at the same side adjacent the bottom surface of the base (or they may be directly formed on the bottom surface). The pair of second pivoting portions 1121 engages the first pivoting portions 221. That is, an ear portion with a horizontal through hole is formed as shown in FIG. 5. This ear portion may be inserted into the groove 2211 and be located coaxially with the through holes of the first pivoting portions 221. A rotation shaft 222 may be installed into theses through holes. The indicating component may rotate relative to the power getting plug via said shaft. More preferably, a friction cushion 223 is placed on a contact arc surface between the second pivoting portion 1121 and groove 2211 for increasing friction force between the first and second pivoting portions 221, 1121. By this manner, the base 112 may be located at any angle with respect to the lower cover 22 due to rotation shaft 222.

In entire indicator, the indicating component 1 and USB conversion circuit 23 are connected with each other in parallel. As described above, the USB conversion circuit 23 is connected with the positive and negative electrodes of the car power getting receptacle through the positive and negative electrode connecting elements 24 and 25 respectively. The indicating component 1 is electrically connected to the positive and negative electrodes of the car power getting receptacle through well known lead lines (not shown). In this embodiment, a through hole is defined in the lower cover 22 at a location between its rectangular through hole 224 and second pivoting portion 1121 through which a lead line passes and connects to the indicating component 1 so as to obtain power.

A plurality of auxiliary components 14 are also provided to the indicator. It includes a button tab 141 for clasping the base 112 and lover cover 22, a corresponding spring 142, a button 143 for controlling displayed contents on the display screen 12, and an indicating lamp 145 for indicating power status.

Based on above description of the structure, when the insertable indicator with a spare receptacle according to the invention is used as a tire pressure status instrument, the power getting plug 2 is inserted into the power getting receptacle of the car. When powered, the display screen 12 starts. According to desire, the driver may select to rotate the indicating component 1 so as to easily watch the displayed contents. At this time, the USB socket 231 which had been masked by the indicating component 1 is now exposed for use.

Summarily, the insertable indicator with a spare receptacle and tire pressure status instrument of the invention have small size, various functions, optimized design, are convenient for use and have expansive application.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. An insertable indicator with a spare receptacle comprising an indicating component and a power getting plug, the indicating component comprises an enclosure and an display screen disposed in the enclosure for displaying content, the power getting plug is intended for connection with a car power getting receptacle for obtaining power therefrom and supplying it to the display screen, wherein the indicating component of the enclosure is pivoted with a side of an exposed end of the power getting plug; and an end surface of the exposed end of the power getting plug is provided with a spare receptacle electrically connected to the car power getting receptacle.

2. The insertable indicator with a spare receptacle according to claim 1, wherein an ear portion with a pivoting hole is formed on a periphery adjacent to one side of the bottom of the base; an ear portion with a pivoting hole is formed on a periphery at one side of an exposed end of the power getting plug; the pivoting holes of the ear portions of the enclosure and power getting plug are coaxially located; and a rotation shaft passes through both pivoting holes so as to realize pivoting.

3. The insertable indicator with a spare receptacle according to claim 1, wherein an ear portion with a pivoting hole is formed on a periphery of one side of the bottom of the base; an ear portion with a pivoting hole is formed on a periphery at one side of an exposed end of the power getting plug; the pivoting holes of the ear portions of the enclosure and power getting plug are coaxially located; and a rotation shaft passes through both pivoting holes so as to realize pivoting.

4. The insertable indicator with a spare receptacle according to claim 2, wherein a friction cushion is placed between the ear portion of the enclosure and that of the power getting plug.

5. The insertable indicator with a spare receptacle according to claim 3, wherein the enclosure of the indicating component comprises a base, an upper casing and an upper cover; the base and upper casing are fastened together to form a receiving space for installing the display screen; and a transparent window is defined in the upper cover for exposing the display screen.

6. The insertable indicator with a spare receptacle according to claim 3, wherein the power getting plug further comprises:
a conversion circuit for obtaining power from the car power getting receptacle and providing the same to the spare receptacle;
a positive electrode connecting element connected with the positive electrodes of the conversion circuit and car power getting receptacle;
a negative electrode connecting element connected with the negative electrodes of the conversion circuit and car power getting receptacle;
a lower casing inserted into the car power getting receptacle and having an inner space for accommodating the conversion circuit, positive and negative electrode connecting elements; and
a lower casing covered on the exposed end of the lower casing so as to form an end surface of the exposed end.

7. The insertable indicator with a spare receptacle according to claim 6, wherein the conversion circuit is integrated into two parallel circuit boards; and the spare receptacle is sandwiched between the two circuit boards.

8. The insertable indicator with a spare receptacle according to claim 3, wherein the spare receptacle is a USB socket.

9. The insertable indicator with a spare receptacle according to claim 6, wherein the positive electrode connecting element comprises a positive electrode pushing needle and a positive electrode resilient tongue; one end of the positive electrode resilient tongue is exposed out of the power getting plug and connected with the positive electrode of the car power getting receptacle, and the other end thereof locates between two conversion circuits; and the positive electrode resilient tongue connects the positive electrode pushing needle and one of the conversion circuit board.

10. The insertable indicator with a spare receptacle according to claim 6, wherein the negative electrode connecting element comprises a negative electrode resilient tongue and a spring bracket; part of the negative electrode resilient tongue is exposed out of the lower casing and connects the negative electrode of the car power getting receptacle; the negative electrode resilient tongue is mounted on the spring bracket and is positioned between two conversion circuit boards and is electrically connected with the conversion circuit boards; and the spring bracket is also intended for maintaining separation between the negative electrode resilient tongue and the positive electrode pushing needle or between it and the positive electrode resilient tongue.

11. A tire pressure status instrument comprising a tire pressure monitor circuit and a tire pressure signal receiving antenna, wherein incorporating an insertable indicator with a spare receptacle according to claim 1; and said tire pressure monitor circuit and tire pressure signal receiving antenna are disposed in the indicating component.

* * * * *